(12) United States Patent
Liu

(10) Patent No.: US 10,922,498 B2
(45) Date of Patent: Feb. 16, 2021

(54) METHOD FOR SIMULTANEOUSLY TRANSLATING LANGUAGE OF SMART IN-VEHICLE SYSTEM AND RELATED PRODUCTS

(71) Applicant: WING TAK LEE SILICONE RUBBER TECHNOLOGY (SHENZHEN) CO., LTD, Guangdong (CN)

(72) Inventor: Tak Nam Liu, Guangdong (CN)

(73) Assignee: WING TAK LEE SILICONE RUBBER TECHNOLOGY (SHENZHEN) CO., LTD, Shenzhen (CN)

(*) Notice: Subject to any disclaimer, the term of this patent is extended or adjusted under 35 U.S.C. 154(b) by 84 days.

(21) Appl. No.: 16/354,237

(22) Filed: Mar. 15, 2019

(65) Prior Publication Data

US 2020/0218782 A1 Jul. 9, 2020

(30) Foreign Application Priority Data

Jan. 4, 2019 (CN) .......................... 201910009472.6

(51) Int. Cl.
| | |
|---|---|
| *G06F 40/58* | (2020.01) |
| *G06N 3/04* | (2006.01) |
| *G10L 15/00* | (2013.01) |
| *G10L 15/16* | (2006.01) |
| *G10L 15/22* | (2006.01) |

(52) U.S. Cl.
CPC .......... *G06F 40/58* (2020.01); *G06N 3/0445* (2013.01); *G10L 15/005* (2013.01); *G10L 15/16* (2013.01); *G10L 15/22* (2013.01)

(58) Field of Classification Search
CPC ...................................................... G06F 9/454
See application file for complete search history.

(56) References Cited

U.S. PATENT DOCUMENTS

| | | | |
|---|---|---|---|
| 2015/0356401 A1* | 12/2015 | Vinyals ................... | G06F 40/40 706/15 |
| 2017/0076199 A1* | 3/2017 | Zhang ....................... | G06N 3/02 |
| 2018/0046618 A1* | 2/2018 | Lee .......................... | G06F 40/53 |
| 2018/0075343 A1* | 3/2018 | van den Oord ....... | G06N 3/0472 |
| 2018/0129937 A1* | 5/2018 | Bradbury .............. | G06N 3/0445 |
| 2018/0225572 A1* | 8/2018 | Yan ......................... | G06N 7/005 |
| 2018/0268823 A1* | 9/2018 | Miura ..................... | G06F 16/635 |
| 2018/0300317 A1* | 10/2018 | Bradbury .............. | G06F 40/216 |
| 2018/0329897 A1* | 11/2018 | Kalchbrenner ......... | G06N 3/084 |
| 2019/0080691 A1* | 3/2019 | Meng ....................... | G10L 15/22 |
| 2019/0129947 A1* | 5/2019 | Shin ...................... | G06N 3/0445 |
| 2019/0130249 A1* | 5/2019 | Bradbury ................ | G06N 3/08 |

(Continued)

*Primary Examiner* — Douglas Godbold

(57) ABSTRACT

The present application provides a method for simultaneously translating the language of a smart in-vehicle system and the related product, wherein the method comprises the steps of: a smart in-vehicle device receiving the first language to be played; the smart in-vehicle device acquiring the first voice of a navigation software, wherein the first voice is the second language, and constructing the input data at the current time t of a cyclic neural network according to the first voice; and inputting the input data to the preset the cyclic neural network for calculation to obtain output result, the second voice corresponding to the first language is obtained according to the output result, and the second voice is played.

6 Claims, 3 Drawing Sheets

(56) References Cited

U.S. PATENT DOCUMENTS

| | | | |
|---|---|---|---|
| 2019/0163747 A1* | 5/2019 | Kang | G10L 15/063 |
| 2019/0266246 A1* | 8/2019 | Wang | G06F 40/58 |
| 2020/0034435 A1* | 1/2020 | Norouzi | G06N 3/0445 |
| 2020/0034436 A1* | 1/2020 | Chen | G06F 40/58 |
| 2020/0073947 A1* | 3/2020 | Bertoldi | G06F 40/47 |
| 2020/0097554 A1* | 3/2020 | Rezagholizadeh | G06F 40/42 |
| 2020/0159822 A1* | 5/2020 | Roh | G06N 20/00 |

* cited by examiner

US 10,922,498 B2

METHOD FOR SIMULTANEOUSLY TRANSLATING LANGUAGE OF SMART IN-VEHICLE SYSTEM AND RELATED PRODUCTS

CROSS REFERENCE TO RELATED APPLICATION

The present application claims priority to Chinese patent application No. 201910009472.6, entitled "Method For Simultaneously Translating Language Of Smart In-Vehicle System And Related Products", filed on Jan. 24, 2019, the entire content of which is incorporated herein by reference.

TECHNICAL FIELD

The present application relates to the field of terminals and communications, and in particular to a method for simultaneously translating the language of a smart in-vehicle system and related products.

BACKGROUND

The smart in-vehicle system takes up a large share of the in-vehicle system currently. The smart in-vehicle system can be praised by users by installing an app by itself. The navigation software is an app which is installed most on the in-vehicle system and is used most frequently currently. The navigation software has a voice playback function, but the voice has only one language. For vehicles in which drivers are not fixed, such as rental cars, etc., the system cannot meet the demand of the drivers for various languages in the navigation software, which affects the user experience.

SUMMARY

The embodiments of the present application provide a method for simultaneously translating the language of a smart in-vehicle system and related products, which can translate the voice of the navigation software in real time, thereby improving the user experience.

The first embodiment of the present application provides a method for simultaneously translating the language of a smart in-vehicle system, wherein the method comprises the steps of:

receiving, by a smart in-vehicle device, a first language to be played;

acquiring, by the smart in-vehicle device, a first voice of a navigation software, wherein the first voice is a second language, and constructing the input data $X_t$ at the current time t of a cyclic neural network according to the first voice; and acquiring, by the smart in-vehicle device, an output result $S_{t-1}$ at the previous time of the hidden layer of the cyclic neural network and a weight W; allocating, by the smart in-vehicle device, m threads, and dividing the weight W into m weight blocks, and allocating the m weight blocks to m threads in one-to-one correspondence; dividing the output result $S_{t-1}$ into m output blocks, and dividing the input data $X_t$ into m input blocks; wherein each of the first m−1 weight blocks contains 4 columns of weight W element values, the last weight block contains r columns of weight W element values; each of the first m−1 input blocks contains 4 rows of input data $X_t$ element values, the last weight block contains r rows of weight $X_t$ element values, each of the first m−1 output blocks contains 4 rows of $S_{t-1}$ element values, and the last weight block contains r rows of $S_{t-1}$ element values;

wherein each of the threads calls m input blocks, respectively, to perform an inner product operation with the element value of the weight block corresponding to each of the threads to obtain a first result, the first results of all threads are arranged to obtain a first calculation result, each of the threads calls m output blocks, respectively, to perform an inner product operation with the element value of the weight block corresponding to each of the threads to obtain a second result, the second results of all threads are arranged to obtain a second calculation result, the sum of the first calculation result and the second calculation result is calculated to obtain the output result $S_t$ of the hidden layer at the time t, an activation operation is performed on $S_t$ to obtain the output result $O_t$ at the time t, the second voice corresponding to the first language is obtained according to the output result $O_t$, and the second voice is played;

the r is a remainder of M/4, and the M is a column value of the weight;

$m=[M/]+1$.

Preferably, each of the threads calls m input blocks, respectively, to perform an inner product operation with the element value of the weight block corresponding to each of the threads to obtain a first result, which may specifically comprise:

each of the threads calling m−1 input blocks, respectively, to perform an inner product operation with the element value of the weight block corresponding to each of the threads to obtain (m−1)*4*4 inner product results, each of the threads calling the last input block to perform an inner product operation with the first weight block to obtain r*4*4 inner product results, and combining (m−1)*4*4 inner product results with r*4*4 inner product results to obtain the first result of each of the threads.

Preferably, the activation operation is: a sigmoid function or a tanh function.

According to the second embodiment, there is provided a smart in-vehicle device, wherein the smart in-vehicle device comprises:

an acquiring unit configured to acquire a first language to be played; and acquire a first voice of a navigation software;

a processing unit configured to: construct the input data $X_t$ at the current time t of a cyclic neural network according to the first voice, wherein the first voice is a second language; acquire an output result $S_{t-1}$ at the previous time of the hidden layer of the cyclic neural network and a weight W, wherein the smart in-vehicle device allocates m threads, divides the weight W into m weight blocks, and allocates the m weight blocks to m threads in one-to-one correspondence; divide the output result $S_{t-1}$ into m output blocks, and divide the input data $X_t$ into m input blocks; wherein each of the first m−1 weight blocks contains 4 columns of weight W element values, the last weight block contains r columns of weight W element values; each of the first m−1 input blocks contains 4 rows of input data $X_t$ element values, the last weight block contains r rows of weight $X_t$ element values, each of the first m−1 output blocks contains 4 rows of $S_{t-1}$ element values, and the last weight block contains r rows of $S_{t-1}$ element values; wherein each of the threads calls m input blocks, respectively, to perform an inner product operation with the element value of the weight block corresponding to each of the threads to obtain a first result, the first results of all threads are arranged to obtain a first calculation result, each of the threads calls m output blocks, respectively, to perform an inner product operation with the element value of the weight block corresponding to each of the threads to obtain a second result, the second results of all threads are arranged to obtain a second calculation result, the sum of the first calculation result and the second calculation result is calculated to obtain the output result $S_t$ of the hidden layer at the time t, an activation operation is performed on $S_t$ to obtain the output result $O_t$ at the time t, the second voice corresponding to the first language is obtained according to the output result $O_t$, and the second voice is played;

the r is a remainder of M/4, and the M is a column value of the weight;

$m=[M/4]+1$.

Preferably, the activation operation is: a sigmoid function or a tanh function.

According to the third embodiment, there is provided a computer readable storage medium in which a computer program for exchanging electronic data is stored, wherein the computer program causes the computer to perform the method provided by the first aspect.

According to the fourth embodiment, there is provided a computer program product, wherein the computer program product comprises a non-transitory computer readable storage medium in which a computer program is stored, and the computer program is operable to cause the computer to perform the method provided by the first aspect.

The implementation of the embodiments of the present application has the following beneficial effects.

It can be seen that the technical solution provided by the present application calls the cyclic neural network to translate the original language to obtain a translated language when determining that the original language of the first game is inconsistent with the system language, and displays or plays the translated language, thereby translating the language of the first game to improve the user experience.

BRIEF DESCRIPTION OF THE DRAWINGS

In order to more clearly illustrate the technical solution in the embodiments of the present application, the drawings used in the description of the embodiments will be briefly described below. Obviously, the drawings in the following description are some embodiments of the present application. Those skilled in the art can also obtain other drawings based on these drawings without paying any creative work.

DESCRIPTION OF THE EMBODIMENTS

The technical solution in the embodiments of the present application is clearly and completely described below with reference to the accompanying drawings in the embodiments of the present application. Obviously, the described embodiments are a part of the embodiments of the present application, rather than all of the embodiments. All other embodiments obtained by those skilled in the art based on the embodiments of the present application without paying any creative work are within the scope of protection of the present application.

The terms, such as "first", "second", "third" and "fourth" etc., in the specification and claims of the present application and the accompanying drawings are used to distinguish different objects, and are not intended to describe a specific order. Furthermore, the terms "comprise" and "have" and any variations thereof are intended to cover a non-exclusive inclusion. For example, a process, method, system, product, or device that comprises a series of steps or units is not limited to the listed steps or units, but optionally comprises steps or units that are not listed, or optionally comprises other steps or units inherent to these processes, methods, products or devices.

References to "an embodiment" herein mean that a particular feature, structure, or characteristic described in connection with the embodiments can be included in at least one embodiment of the present application. The appearances of the phrase in various places in the specification are not necessarily referring to the same embodiments, and are not exclusive or alternative embodiments that are mutually exclusive from other embodiments. Those skilled in the art will explicitly and implicitly understand that the embodiments described herein can be combined with other embodiments.

Figure 1:
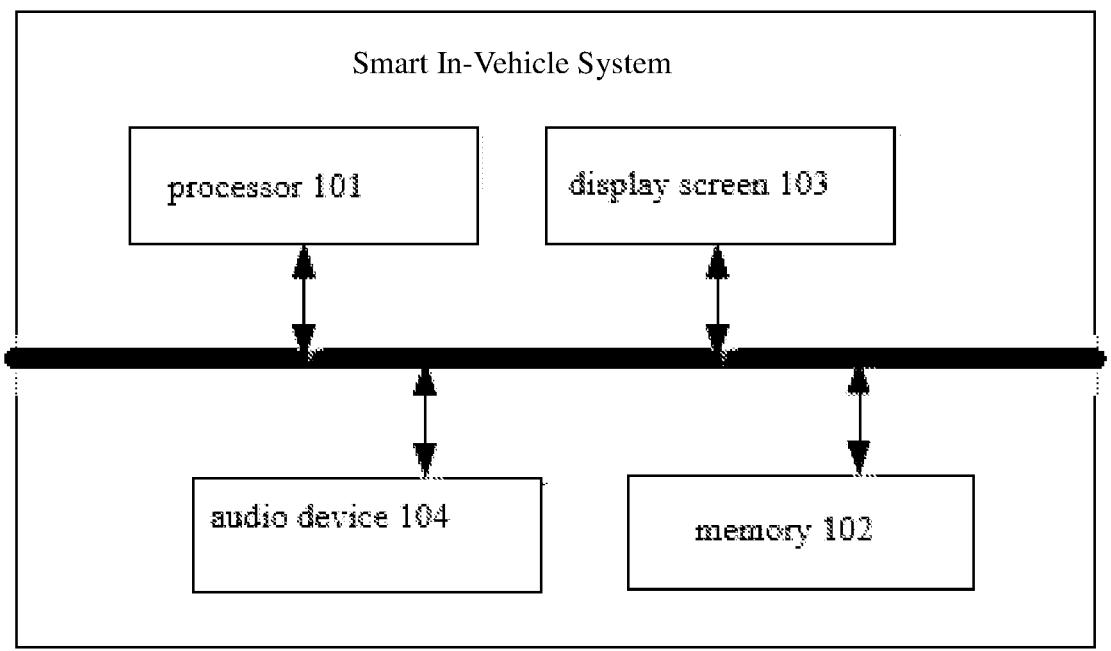
FIG. 1 is a schematic structural diagram of a computing device according to an embodiment of the present application.

Referring to FIG. 1, FIG. 1 is a schematic structural diagram of a smart in-vehicle device. As shown in FIG. 1, the smart in-vehicle device may comprise a processor 101, a memory 102, a display screen 103, an audio device 104, and a camera, wherein the processor 101 is connected to the memory 102, the display screen 103, the audio device 104, and the camera via a bus.

Figure 2:
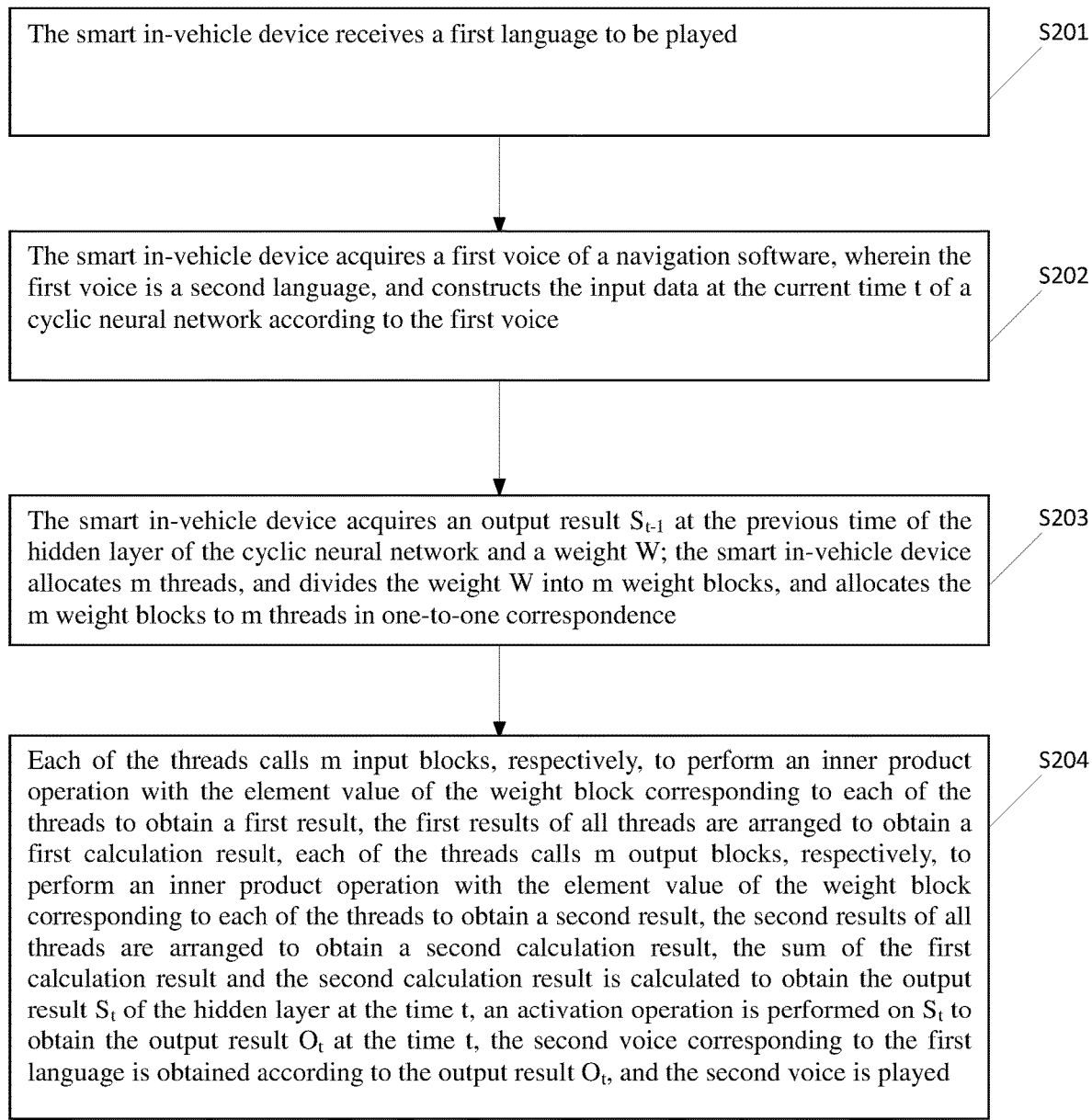
FIG. 2 is a flow schematic diagram of a method for simultaneously translating a language of a smart in-vehicle system according to an embodiment of the present application.

The present application provides a method for simultaneously translating the language of a smart in-vehicle system. The method is implemented using the smart in-vehicle device as shown in FIG. 1. As shown in FIG. 2, the method comprises the following steps:

At Step S201, the smart in-vehicle device receives the first language to be played.

At Step S202, the smart in-vehicle device acquires a first voice of a navigation software, wherein the first voice is a second language, and constructs the input data $X_t$ at the current time t of a cyclic neural network according to the first voice.

At Step S203, the smart in-vehicle device acquires an output result $S_{t-1}$ at the previous time of the hidden layer of the cyclic neural network and a weight W; the smart in-vehicle device allocates m threads, and divides the weight W into m weight blocks, and allocates the m weight blocks to m threads in one-to-one correspondence; divides the output result $S_{t-1}$ into m output blocks, and divides the input data $X_t$ into m input blocks; wherein each of the first m−1 weight blocks contains 4 columns of weight W element values, the last weight block contains r columns of weight W element values; each of the first m−1 input blocks contains 4 rows of input data $X_t$ element values, the last weight block contains r rows of weight $X_t$ element values, each of the first m−1 output blocks contains 4 rows of $S_{t-1}$ element values, and the last weight block contains r rows of $S_{t-1}$ element values.

At Step S204, each of the threads calls m input blocks, respectively, to perform an inner product operation with the element value of the weight block corresponding to each of the threads to obtain a first result, the first results of all threads are arranged to obtain a first calculation result, each of the threads calls m output blocks, respectively, to perform an inner product operation with the element value of the weight block corresponding to each of the threads to obtain a second result, the second results of all threads are arranged to obtain a second calculation result, the sum of the first calculation result and the second calculation result is calculated to obtain the output result $S_t$ of the hidden layer at the time t, an activation operation is performed on $S_t$ to obtain the output result $O_t$ at the time t, the second voice corresponding to the first language is obtained according to the output result $O_t$, and the second voice is played.

Obtaining a second voice corresponding to the first language according to the output result $O_t$ may adopt the method of obtaining the existing cyclic neural network model, such as the Google cyclic neural network model, and the Baidu neural network model. The cyclic neural network can also refer to the paper about the cyclic neural network.

The technical solution provided by the present application allocates parallel operations of multiple threads to the cyclic neural network when the voice of the navigation is determined to be inconsistent with the voice requested by the user, and performs data splitting, thereby improving the calculation speed and improving the user experience.

Figure 3:
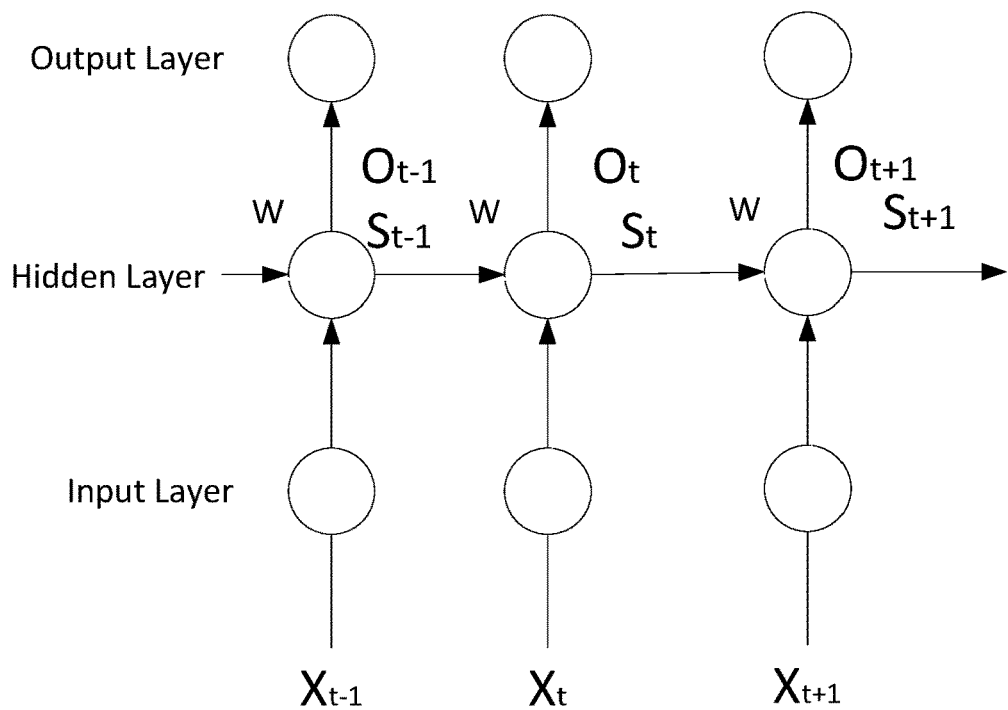
FIG. 3 is a schematic diagram of a cyclic neural network according to an embodiment of the present application.

The cyclic neural network is a neural network model commonly used for voice translation. The cyclic neural network has a structure as shown in FIG. 3, comprising an input layer, a hidden layer, and an output layer. The output structure of the hidden layer is used as an input data of the hidden layer of the next time.

As shown in FIG. 3, for example, the output result of the hidden layer at the time t is the output of the hidden layer at the next time t+1.

As shown in FIG. 3, W denotes a weight, $X_{t-1}$ denotes the input data of the input layer at the time t−1, $X_t$ denotes the input data of the input layer at the time t, $S_{t-1}$ denotes the output result of the hidden layer at the time t−1, and $O_{t-1}$ denotes the output result of the output layer at the time t−1;

Take time t as an example:

$$S_t = w \times X_t + w \times S_{t-1}$$

$$I_t = f(S_t)$$

Where f denotes an activation function, including, but not limited to, a sigmoid function, a tanh function, etc.

$$\text{sigmoid}(x) = \frac{1}{1-e^x} \quad \tanh(x) = \frac{e^x - e^{-x}}{e^x + e^{-x}}$$

Of course, in the actual application, other activation functions can also be used.

The r is a remainder of M/4, and the M is a column value of the weight.

$$m = [M/4] + 1.$$

Each of the threads calls m input blocks, respectively, to perform an inner product operation with the element value of the weight block corresponding to each of the threads to obtain a first result, which may specifically comprise:

each of the threads calling m−1 input blocks, respectively, to perform an inner product operation with the element value of the weight block corresponding to each of the threads to obtain (m−1)*4*4 inner product results, each of the threads calling the last input block to perform an inner product operation with the first weight block to obtain r*4*4 inner product results, and combining (m−1)*4*4 inner product results with r*4*4 inner product results to obtain the first result of the first thread. That is, the first result comprises (m−1+r)*4*4 inner product results, each of the inner product results is an element value of the first calculation result, and the position of the first calculation result of the inner product result can be determined based on the calculation rule of multiplying a matrix by another matrix. Similarly, for the output block, the above calculation can also be used to obtain the second result.

The position of the first calculation result of the inner product result can be determined based on the calculation rule of multiplying a matrix by another matrix, which may specifically be as follows:

if the inner product result is obtained by performing an inner product operation on the first row of elements of the input data and the first column of elements of the weight, the position of the first calculation result of the inner product result is the column value 1 and the row value 1, and if the inner product result is obtained by performing an inner product operation on the first row of elements of the input data and the second column of elements of the weight, the position of the first calculation result of the inner product result is the column value 2 and the row value 1. Similarly, the positions of all the inner product results can be determined.

Figure 4:
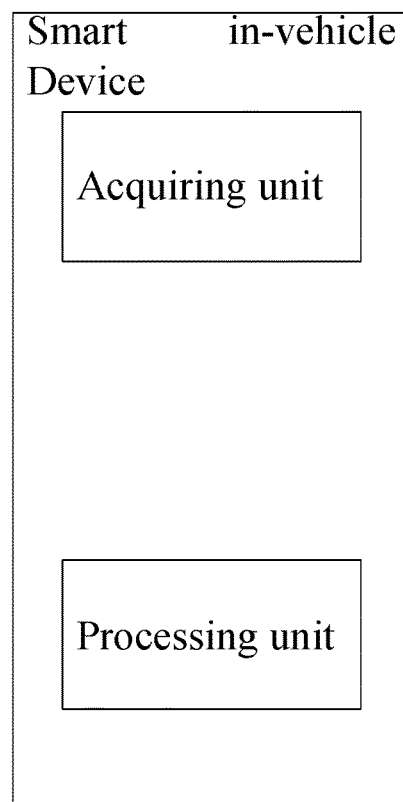
FIG. 4 is a schematic diagram of a smart in-vehicle device according to an embodiment of the present application.

Referring to FIG. 4, FIG. 4 provides a smart in-vehicle device, wherein the smart in-vehicle device comprises:

an acquiring unit configured to acquire a first language to be played; and acquire a first voice of a navigation software;

a processing unit configured to: construct the input data $X_t$ at the current time t of a cyclic neural network according to the first voice, wherein the first voice is a second language; acquire an output result $S_{t-1}$ at the previous time of the hidden layer of the cyclic neural network and a weight W, wherein the smart in-vehicle device allocates m threads, divides the weight W into m weight blocks, and allocates the m weight blocks to m threads in one-to-one correspondence; divide the output result $S_{t-1}$ into m output blocks, and divide the input data $X_t$ into m input blocks; wherein each of the first m−1 weight blocks contains 4 columns of weight W element values, the last weight block contains r columns of weight W element values; each of the first m−1 input blocks contains 4 rows of input data $X_t$ element values, the last weight block contains r rows of weight $X_t$ element values, each of the first m−1 output blocks contains 4 rows of $S_{t-1}$ element values, and the last weight block contains r rows of $S_{t-1}$ element values; wherein each of the threads calls m input blocks, respectively, to perform an inner product operation with the element value of the weight block corresponding to each of the threads to obtain a first result, the first results of all threads are arranged to obtain a first calculation result, each of the threads calls m output blocks, respectively, to perform an inner product operation with the element value of the weight block corresponding to each of the threads to obtain a second result, the second results of all threads are arranged to obtain a second calculation result, the sum of the first calculation result and the second calculation result is calculated to obtain the output result $S_t$ of the hidden layer at the time t, an activation operation is performed on $S_t$ to obtain the output result $O_t$ at the time t, the second voice corresponding to the first language is obtained according to the output result $O_t$, and the second voice is played;

The embodiments of the present application further provide a computer readable storage medium, wherein a computer program for exchanging electronic data is stored in the computer readable storage medium, wherein the computer program causes the computer to perform some or all of the steps of any method for simultaneously translating a language of a smart in-vehicle device as described in the above method embodiments.

The embodiments of the present application further provide a computer program product, wherein the computer program product comprises a non-transitory computer readable storage medium in which a computer program is stored, and the computer program is operable to cause the computer to perform some or all of the steps of any method for simultaneously translating a language of a smart in-vehicle device as described in the above method embodiments.

It should be noted that, for the sake of brevity, each of the above method embodiments is described as a combination of a series of actions, but those skilled in the art should understand that the present application is not limited by the described action sequence because certain steps may be performed in other sequences or concurrently in accordance with the present application. In addition, those skilled in the art should also understand that the embodiments described in the specification are all optional embodiments, and the actions and modules involved are not necessarily required by the present application.

In the above embodiments, the description of each of the embodiments has its own emphasis, and the parts that are not detailed in a certain embodiment can refer to the related descriptions of other embodiments.

In the several embodiments provided by the present application, it should be understood that the disclosed device may be implemented in other ways. For example, the device embodiments described above are merely illustrative. For example, the division of the unit is only a logical function division. In actual implementation, there may be another division manner. For example, a plurality of units or components may be combined or may be integrated into another system, or some features may be ignored or not executed. In addition, the mutual coupling or direct coupling or communication connection shown or discussed may be an indirect coupling or communication connection through some interfaces, devices or units, and may be electrical or in other forms.

The units described as separate components may or may not be physically separated, and the components displayed as units may or may not be physical units, that is, may be located in one place, or may be distributed to a plurality of network units. Some or all of the units may be selected according to actual needs to achieve the purpose of the solution of the embodiment.

In addition, each of the functional units in each of the embodiments of the present application may be integrated into one processing unit, or each of the units may exist physically separately, or two or more of the units may be integrated into one unit. The above integrated unit may be implemented in the form of hardware or in the form of a software program module.

If implemented in the form of a software program module and sold or used as a standalone product, the integrated unit may be stored in a computer readable memory. Based on such understanding, the technical solution of the present application in essence, or the part making contributions to the prior art, or all or some of the technical solution may be embodied in the form of a software product. The computer software product is stored in a memory, comprising several instructions to cause the computer device (which may be a personal computer, a server or a network device, etc.) to perform all or some of the steps of the methods described in each of the embodiments of the present application. The above memory comprises various media, such as: a USB flash disk, a Read-Only Memory (ROM), a Random Access Memory (RAM), a removable hard disk, a magnetic disk, or an optical disk, in which program codes may be stored.

Those skilled in the art can understand that all or some of steps in each of the methods of the above embodiments can be completed by a program to instruct related hardware. The program can be stored in a computer readable memory, and the memory may comprise: a flash drive, a Read-Only Memory (ROM), a Random Access Memory (RAM), a magnetic disk or an optical disk, etc.

The embodiments of the present application have been described in detail above. Specific examples are applied herein to set forth the principles and embodiments of the present application. The description of the above embodiments is only used to help understand the method of the present application and its core ideas; at the same time, those skilled in the art will have a change in the specific embodiments and the scope of application according to the idea of the present application. In summary, the content of the present specification should not be construed as limiting the present application.

What is claimed is:

1. A method for simultaneously translating a language of a smart in-vehicle system, wherein the method comprises:
receiving, by a smart in-vehicle device, a first language to be played;
acquiring, by the smart in-vehicle device, a first voice of a navigation software, wherein the first voice is a second language, and constructing an input data $X_t$ at a current time t of a cyclic neural network according to the first voice; and
acquiring, by the smart in-vehicle device, an output result $S_{t-1}$ at a previous time of the hidden layer of the cyclic neural network and a weight W; allocating, by the smart in-vehicle device, m threads, and dividing the weight W into m weight blocks, and allocating the m weight blocks to m threads in one-to-one correspondence; dividing the output result $S_{t-1}$ into m output blocks, and dividing the input data $X_t$ into m input blocks; wherein each of the first m−1 weight blocks contains 4 columns of weight W element values, the last weight block contains r columns of weight W element values; each of the first m−1 input blocks contains 4 rows of input data $X_t$ element values, the last weight block contains r rows of weight $X_t$ element values, each of the first m−1 output blocks contains 4 rows of $S_{t-1}$ element values, and the last weight block contains r rows of $S_{t-1}$ element values;
wherein each of the threads calls m input blocks, respectively, to perform an inner product operation with the element value of the weight block corresponding to each of the threads to obtain a first result, the first results of all threads are arranged to obtain a first calculation result, each of the threads calls m output blocks, respectively, to perform an inner product operation with the element value of the weight block corresponding to each of the threads to obtain a second result, the second results of all threads are arranged to obtain a second calculation result, the sum of the first calculation result and the second calculation result is calculated to obtain the output result $S_t$ of the hidden layer at the time t, an activation operation is performed on $S_t$ to obtain the output result $O_t$ at the time t, the second voice corresponding to the first language is obtained according to the output result $O_t$, and the second voice is played;

the r is a remainder of M/4, and the M is a column value of the weight;

$m=[M/4]+1$.

2. The method of claim 1, wherein each of the threads calls m input blocks respectively, to perform an inner product operation with the element value of the weight block corresponding to each of the threads to obtain a first result, which may specifically comprise:

each of the threads calling m−1 input blocks, respectively, to perform an inner product operation with the element value of the weight block corresponding to each of the threads to obtain (m−1)*4*4 inner product results, each of the threads calling the last input block to perform an inner product operation with the first weight block to obtain r*4*4 inner product results, and combining (m−1)*4*4 inner product results with r*4*4 inner product results to obtain the first result of each of the threads.

3. The method of claim 1, wherein the activation operation is: a sigmoid function or a tanh function.

4. A smart in-vehicle device, wherein the smart in-vehicle device comprises:

an acquiring unit configured to acquire a first language to be played; and acquire a first voice of a navigation software;

a processing unit configured to: construct an input data $X_t$ at a current time t of a cyclic neural network according to the first voice, wherein the first voice is a second language;

acquire an output result $S_{t-1}$ at a previous time of the hidden layer of the cyclic neural network and a weight W, wherein the smart in-vehicle device allocates m threads, divides the weight W into m weight blocks, and allocates the m weight blocks to m threads in one-to-one correspondence; divide the output result $S_{t-1}$ into m output blocks, and divide the input data $X_t$ into m input blocks; wherein each of the first m−1 weight blocks contains 4 columns of weight W element values, the last weight block contains r columns of weight W element values; each of the first m−1 input blocks contains 4 rows of input data $X_t$ element values, the last weight block contains r rows of weight $X_t$ element values, each of the first m−1 output blocks contains 4 rows of $S_{t-1}$ element values, and the last weight block contains r rows of $S_{t-1}$ element values; wherein each of the threads calls m input blocks, respectively, to perform an inner product operation with the element value of the weight block corresponding to each of the threads to obtain a first result, the first results of all threads are arranged to obtain a first calculation result, each of the threads calls m output blocks, respectively, to perform an inner product operation with the element value of the weight block corresponding to each of the threads to obtain a second result, the second results of all threads are arranged to obtain a second calculation result, the sum of the first calculation result and the second calculation result is calculated to obtain the output result $S_t$ of the hidden layer at the time t, an activation operation is performed on $S_t$ to obtain the output result $O_t$ at the time t, the second voice corresponding to the first language is obtained according to the output result $O_t$, and the second voice is played;

the r is a remainder of M/4, and the M is a column value of the weight;

$m=[M/4]+1$.

5. The smart in-vehicle device of claim 4, wherein the activation operation is: a sigmoid function or a tanh function.

6. A non-transitory computer readable storage medium in which a computer program for exchanging electronic data is stored, wherein the computer program causes the computer to perform the method of claim 1.

* * * * *